US011711116B2

(12) United States Patent
Bhamri et al.

(10) Patent No.: US 11,711,116 B2
(45) Date of Patent: Jul. 25, 2023

(54) USER EQUIPMENT AND SYSTEM PERFORMING TRANSMISSION AND RECEPTION OPERATIONS

(71) Applicant: Panasonic Intellectual Property Corporation of America, Torrence, CA (US)

(72) Inventors: Ankit Bhamri, Rödermark (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 70 days.

(21) Appl. No.: 17/085,149

(22) Filed: Oct. 30, 2020

(65) Prior Publication Data

US 2021/0051699 A1 Feb. 18, 2021

Related U.S. Application Data

(63) Continuation of application No. PCT/EP2019/077957, filed on Oct. 15, 2019.

(30) Foreign Application Priority Data

Nov. 9, 2018 (EP) ..................................... 18205515

(51) Int. Cl.
*H04B 7/024* (2017.01)
*H04W 72/23* (2023.01)
(Continued)

(52) U.S. Cl.
CPC ............ *H04B 7/024* (2013.01); *H04W 72/23* (2023.01); *H04L 1/0003* (2013.01); *H04L 1/1819* (2013.01);
(Continued)

(58) Field of Classification Search
CPC ......... H04W 72/1289; H04W 72/1263; H04W 72/0446; H04W 72/042; H04W 72/0453; H04L 1/0003; H04L 1/1819; H04B 7/024
See application file for complete search history.

(56) References Cited

U.S. PATENT DOCUMENTS

2012/0176884 A1* 7/2012 Zhang .................... H04B 7/024
370/329
2012/0250641 A1* 10/2012 Sartori .................. H04W 24/10
370/329
(Continued)

FOREIGN PATENT DOCUMENTS

CN WO 2018/141246 A1 * 12/2018 ........ H04W 72/1289
WO 2018/141246 A1 8/2018

OTHER PUBLICATIONS

3GPP TR 36.932 V15.0.0, "3$^{rd}$ Generation Partnership Project; Technical Specification Group Radio Access Network; Scenarios and requirements for small cell enhancements for E-UTRA and E-UTRAN (Release 15)," Jun. 2018, 14 pages.
(Continued)

*Primary Examiner* — Kevin C. Harper
(74) *Attorney, Agent, or Firm* — Seed IP Law Group LLP

(57) ABSTRACT

The present disclosure relates to a mobile terminal, a system and respective methods. The user equipment receives plural PDCCHs from each of plural TRPs within a single TTI, and decodes plural DCIs respectively carried on the received plural PDCCHs from each of the plural TRPs. All of the decoded plural DCIs from each of the plural TRPs are respectively scheduling plural PDSCH receptions or plural PUSCH transmissions on different ones of the plural TRPs. And all of the plural PDSCH receptions or plural PUSCH transmission are scheduled such that one of the decoded plural DCIs from each of the plural TRPs is scheduling a same one PDSCH reception or a same one PUSCH trans-
(Continued)

mission on a same one of the plural TRPs. The user equipment receives or transmits same data in the respectively scheduled plural PDSCH receptions from or PUSCH transmission to each of the plural TRPs.

15 Claims, 6 Drawing Sheets

(51) Int. Cl.
  *H04L 1/00* (2006.01)
  *H04L 1/1812* (2023.01)
  *H04W 72/0446* (2023.01)
  *H04W 72/0453* (2023.01)
  *H04W 72/1263* (2023.01)

(52) U.S. Cl.
  CPC .... *H04W 72/0446* (2013.01); *H04W 72/0453* (2013.01); *H04W 72/1263* (2013.01)

(56) References Cited

U.S. PATENT DOCUMENTS

| | | | | |
|---|---|---|---|---|
| 2012/0282936 | A1* | 11/2012 | Gao | H04L 5/0023 455/450 |
| 2018/0270799 | A1* | 9/2018 | Noh | H04L 5/0094 |
| 2019/0036658 | A1* | 1/2019 | Kim | H04L 5/005 |
| 2019/0379561 | A1* | 12/2019 | Zhang | H04L 25/0228 |
| 2020/0053757 | A1* | 2/2020 | Bagheri | H04L 5/0058 |
| 2021/0352629 | A1* | 11/2021 | Haghighat | H04L 5/0096 |

OTHER PUBLICATIONS

Extended European Search Report, dated Apr. 18, 2019, for European Application No. 18205515.2, 12 pages.
International Search Report, dated Jan. 17, 2020, for International Application No. PCT/EP2019/077957, 3 pages.
Huawei, HiSilicon, "Enhancements on multi-TRP/panel transmission," R1-1812243, Agenda Item: 7.2.8.2, 3GPP TSG RAN WG1 Meeting #95, Spokane, USA, Nov. 12-16, 2018, 10 pages.
Vivo, "Discussion on Enhancements on Multi-TRP/Panel Transmission," Rl-1812323, Agenda Item: 7.2.8.2, 3GPP TSG RAN WG1 #95, Spokane, USA, Nov. 12-16, 2018, 8 pages.
ZTE, "Enhancements on multi-TRP/Panel transmission," R1-1812256, Agenda Item: 7.2.8.2, 3GPP TSG RAN WG1 Meeting #95, Spokane, USA, Nov. 12-16, 2018, 14 pages.

* cited by examiner

USER EQUIPMENT AND SYSTEM PERFORMING TRANSMISSION AND RECEPTION OPERATIONS

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz.

The NR is a follower of the technology represented by Long Term Evolution (LTE) and LTE Advanced (LTE-A). The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like.

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks.

The services eMBB and URLLC are similar in that they both demand a very broad bandwidth, however are different in that the URLLC service requires ultra-low latencies. In NR, the Physical layer is based on time-frequency resources (such as Orthogonal Frequency Division Multiplexing, OFDM in LTE) and may support multiple antenna operation.

For systems like LTE and NR, further improvements and options may facilitating efficient operation of the communication system as well as particular devices pertaining to the system.

BRIEF SUMMARY

One non-limiting and exemplary embodiment facilitates providing robust and prompt signaling in communication using multiple transmission and reception points. In one general aspect, the techniques disclosed herein feature a user equipment which comprises a circuitry and transceiver. The transceiver receives plural PDCCHs, physical downlink control channels, from each one of plural TRPs, transmission and reception points, within a single TTI, transmission time interval. The circuitry decodes plural DCIs, downlink control information, respectively carried on the received plural PDCCHs from each one of the plural TRPs. All of the decoded plural DCIs from each one of the plural TRPs are respectively scheduling plural PDSCH, physical downlink shared channel, receptions or plural PUSCH, physical uplink shared channel, transmissions on different ones of the plural TRPs, and all of the plural PDSCH receptions or plural PUSCH transmission are scheduled such that one of the decoded plural DCIs from each one of the plural TRPs, is scheduling a same one PDSCH reception or a same one PUSCH transmission on a same one of the plural TRPs. And, the transceiver receives or transmits same data in the respectively scheduled plural PDSCH receptions from or plural PUSCH transmission to each one of the plural TRPs.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

Figure 1:
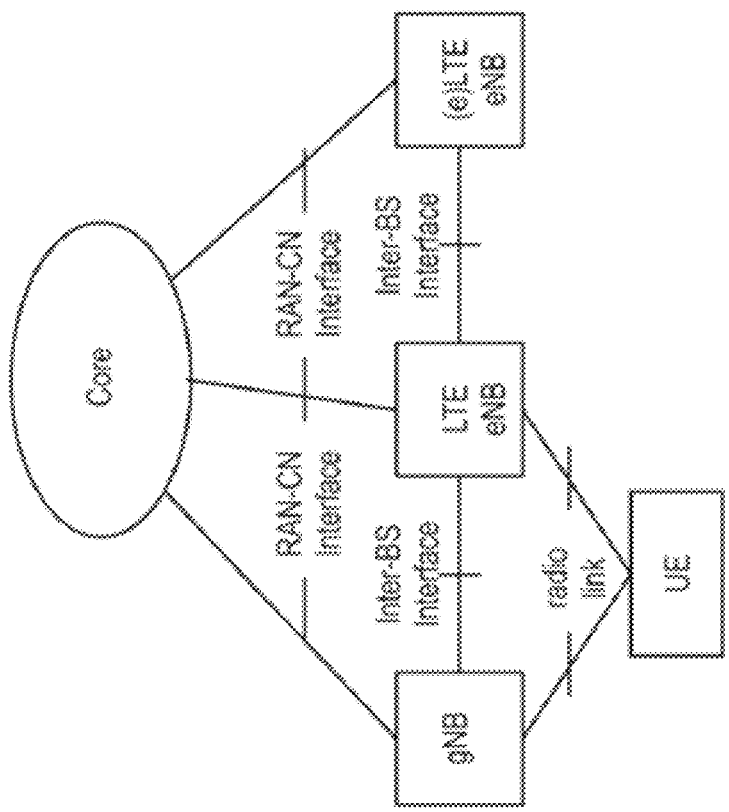
FIG. 1 shows an exemplary architecture for a 3GPP NR system including exemplary user and control plane architecture for the LTE eNB, gNB, and UE.

FIG. 1 shows an exemplary example of a communication system including a base station and a terminal and a core network. Such communication system may be a 3GPP system such as NR and/or LTE and/or UMTS.

For example, as illustrated in FIG. 1, the base station (BS) may be a gNB (gNodeB, e.g., an NR gNB) or an eNB (eNodeB, e.g., an LTE gNB). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

A terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station forms at least part of a system of interconnected units, for instance a (central) baseband unit and different radio frequency units, interfacing different antenna panels or radio heads in the network for providing services to terminals. In other words, a base station provides wireless access to terminals.

The physical layer in NR may provide multi-antenna operation such as MIMO (multiple input, multiple output) which may, for instance, include the use of plural or multiple transmission and reception points (multi-TRP). For instance, a user equipment may receive data from plural TRPs (transmission and reception points), wherein the plural-TRPs may be controlled by the same or different network nodes. The terms multi-point transmission or coordinated multi-point transmission (CoMP) may also be used for multi-TRP communication or transmission.

The technologies described in the present disclosure are not limited to a particular arrangement of TRPs, or a particular relationship between TRPs and gNBs. Accordingly, for instance, multi-TRP operation may be performed by a gNB having different antenna panels or radio heads corresponding to the TRPs and different radio frequency units operating with the respective antennas.

Moreover, in multi-TRP, several options are conceivable with respect to the positional relationship between TRPs, and the distance between two TRPs may vary. For instance, the TRPs may be close, so that a UE receives signals from these TRPs from a similar angle. However, TRPs may also be located at a rather far distance from each other, for instance at remote locations of a network cell. A UE being served by the two TRPs may receive and transmit the signaling from and to the respective TRPs on uncorrelated channels. Accordingly, gains in channel diversity may be optimally utilized.

For instance, multi-TRP may be categorized into two high-level categories. Namely, the distinction between the categories may be made with respect to the backhaul type of the backhaul link between two given TRPs.

On the one hand, an ideal backhaul is a very high throughput and very low latency backhaul such as dedicated point-to-point connection using, e.g., optical fiber. An ideal backhaul is assumed to allow for communication between the TRPs with approximately or almost 0 ms delay (e.g., for LTE-A, technical report 3GPP TR 36.932 V15.0.0 (2018-06) mentions in section 6.1.3 a one-way latency of less the 2.5 us wherein, however, propagation delay in the fiber/cable is not included).

On the other hand, a non-ideal backhaul is a backhaul such as DSL, microwave, and other backhauls like relaying, and may for example involve finite (one-way) delays in the range of 2 ms or 5 ms for communication between the two given TRPs.

Apart from the categorization into ideal backhauls and non-ideal backhauls, a further categorization in multi-TRP MIMO technology may be made with respect to how (central) baseband units are shared between TRPs.

For instance, while there are different RF (radio frequency) units for each of two given TRPs, the TRPs may share the same baseband unit. Therein, the link between the RF units and the baseband unit may be ideal or non-ideal. Alternatively, there may be both different (central) baseband units and different RF units for each TRP. Therein, the respective links between baseband units and RF units as well as the link between the different baseband units may be ideal or non-ideal.

The present disclosure provides approaches which may facilitate multi-TRP operation and may particularly facilitate achieving reliability and robustness. The technologies disclosed may for instance facilitate satisfying the requirements of URLLC by utilizing multi-TRP communication, but are not limited to URLLC use cases. For instance, the technologies disclosed may also be applied to eMBB and mMTC use cases. The present disclosure is applicable to scenarios including one or both of ideal and non-ideal backhauls.

As mentioned above, multiple and far apart TRPs may allow for providing spatial diversity gains. The exploitation of these spatial diversity gains may in particular facilitate transmission and reception in a range of high frequencies where blockage for any of the links or wireless communication channels between a TRP and a UE is particularly possible. In view of this, the techniques disclosed herein may facilitate coordination between multiple points such as TRPs to schedule control channels and/or data channels.

Figure 2:
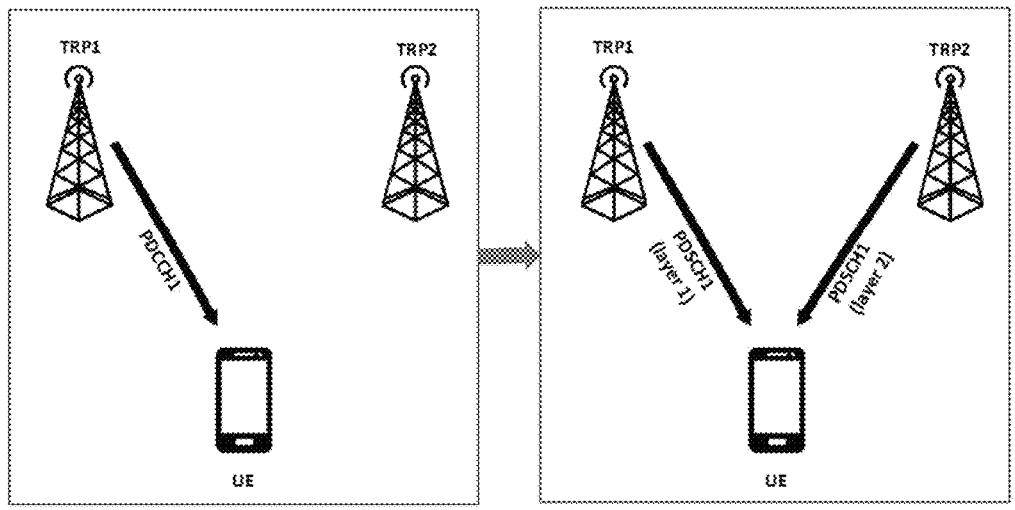
FIGS. 2-4 depict schematic drawings of an example PDCCH (physical downlink control channel) receptions scheduling PDSCH (physical downlink shared channel) receptions to a user equipment from plural transmission and reception points.

An exemplary use case of multi-TRP coordination is illustrated in FIG. 2. One TRP performs a physical downlink control channel (PDCCH) transmission to the UE scheduling same data transmission from plural TRPs. In FIG. 2, one TRP, TRP1, is shown which transmits PDCCH1 to the UE. This PDCCH1 schedules transmissions of same data from two TRPs, TRP1 and TRP2. The scheduled same data is transmitted on a one physical downlink shared channel, PDSCH1. Notably, the two TRPs, TRP1 and TRP2 transmit the one physical downlink shared channel, PDSCH1, on two layers, layer 1 and layer 2. Therewith, simultaneous reception of the same data by the UE is achieved.

However, the present disclosure is not limited to scenarios where one TRP schedules the transmission of same data from plural TRPs to a UE.

Figure 3:
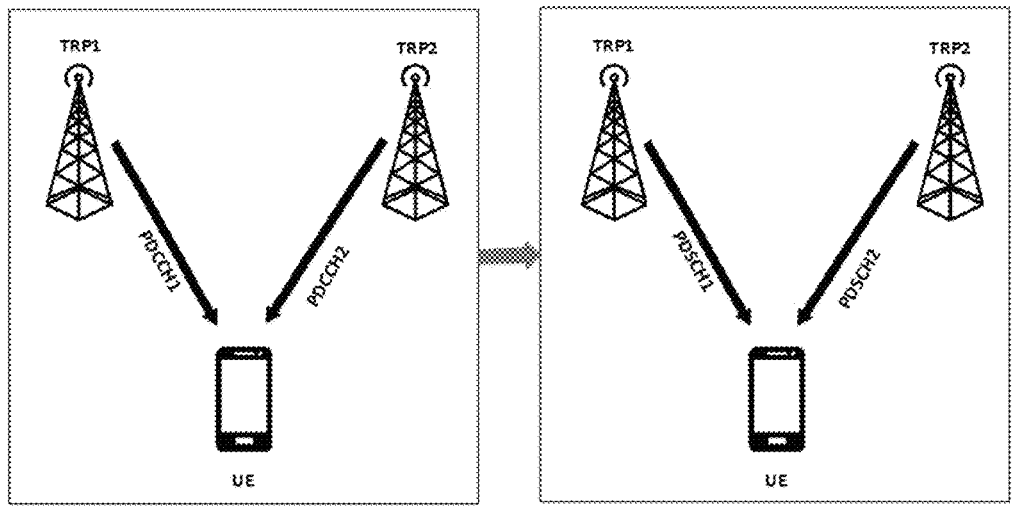

Another exemplary use case of multi-TRP coordination is illustrated in FIG. 3. Plural TRPs perform plural physical downlink control channel (PDCCH) transmissions to the UE respectively scheduling same data transmission from plural TRPs. In FIG. 3, two TRPs, TRP1 and TRP2, are shown which respectively transmit PDCCH1 and PDCCH2 to the UE. The PDCCH1 schedules the transmission of same data from one TRP, TRP1, and the PDCCH2 schedules the transmission of same data from another one TRP, TRP2. The scheduled same data is transmitted on different two physical downlink shared channels, PDSCH1 and PDSCH2.

Both exemplary use cases have been found disadvantageous for meeting URLLC requirements.

Regarding the exemplary use case shown in FIG. 2, when the connection between TRP1 and the UE is blocked, then the scheduling of any data transmissions to the UE are no longer possible. Should, for example, the UE not receive the one physical downlink control channel, PDCCH1 from the TRP1, then absent of this PDCCH1 the UE cannot receive any data transmission in form of PDSCH1 from TRP1 and TRP2. In other words, regardless of an improved reliability and robustness of the data transmissions of PDSCH1 from TRP1 and TRP2, the scheduling thereof results in a bottleneck to the transmission operations.

Regarding the exemplary use case shown in FIG. 3, when the connection between TRP1 and the UE is blocked or when the connection between the TRP2 and the UE is blocked, then the scheduling of the respective data transmission from TRP1 or TRP2 to the UE are no longer possible. Should, for example, the UE not receive the one physical downlink control channel, PDCCH1 from TRP1

(equally applicable for PDCCH2 from TRP2), then absent of this PDCCH1 the UE cannot receive and data transmission in form of PDSCH1 from TRP1. In other words, the mere replication of data transmissions from TRP1 to TRP2 does not improve the reliability and robustness thereof. Still the scheduling of is a bottleneck to the transmission operations.

In this regard, the inventors have recognized that from URLLC perspective, the reliability and robustness of PDCCH is extremely important. If PDCCH is not received or decoded successfully at the UE, then subsequent transmissions/receptions on other physical channels including PDSCH, PUSCH and PUCCH is generally not possible.

Figure 4:
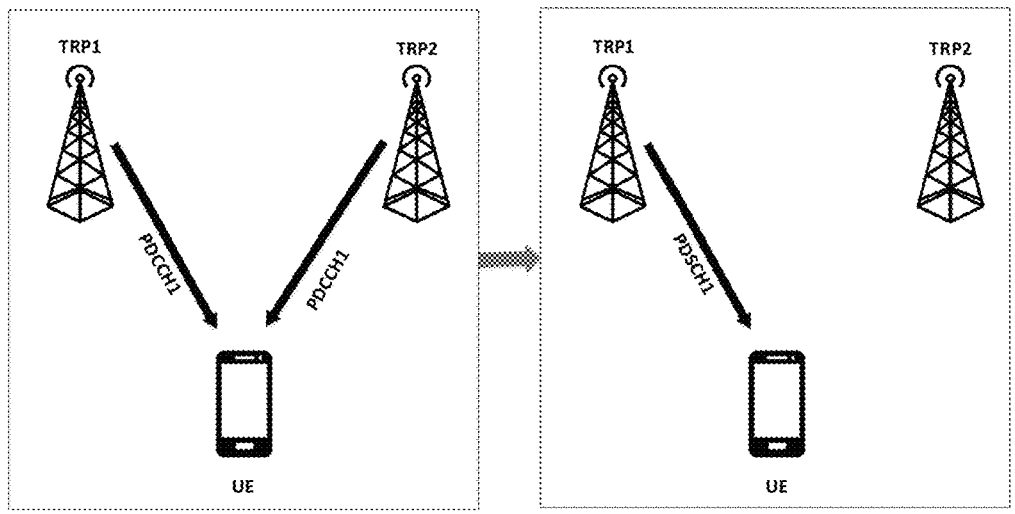

In view of this recognition, a further exemplary use case of multi-TRP coordination is illustrated in FIG. 4. Plural TRPs separated perform a same physical downlink control channel (PDCCH) transmission to the UE which is redundantly scheduling a data transmission from one TRP. In FIG. 4, two TRPs, TRP1 and TRP2, are shown which respectively transmit PDCCH1 and PDCCH1 to the UE. In other words, TRP1 and TRP2 transmit the same PDCCH1 to the UE. And the PDCCH1 schedules the transmission of data from one TRP, TRP1, to the UE. The scheduled data is transmitted on one physical downlink share channel, PDSCH1 from TRP1 to the UE.

Also this further exemplary use case has been found disadvantageous for meeting ULRRC requirements.

Regarding the further exemplary use case shown in FIG. 4, when the connection between TRP1 and the UE is blocked, then the actual transmission of any data to the UE is no longer possible. Should, for example, the UE not receive the one physical downlink control channel, PDCCH1 from the TRP1, the UE may still receive the PDCCH1 from the TRP2. This PDCCH1 from TRP2 then schedules a data transmission from TRP1. However, if the connection between TRP1 and the UE is still blocked, then the UE cannot receive the scheduled data transmission from TRP1. This blockage of scheduled data transmissions from one TRP occurs independently of whether the UE has received the PDCCH1 or not. In other words, even though the UE is aware that there is a scheduled data transmission, the blockage will prevent the UE from successfully receiving same transmission.

The inventors have recognized that the further exemplary use case shown in FIG. 4 is not reliable enough to ensure further transmissions/reception on other physical channels including PDSCH, PUSCH and PUCCH.

Generic Scenario

In view of the above, the inventors have recognized the need for a mechanism facilitates providing robust and prompt signaling in communication using multiple transmission and reception points.

In the following, mobile terminals, base stations, and procedures to meet these needs will be described in relation to the new radio access technology envisioned for the 5G mobile communication systems, but which may also be used in LTE mobile communication system. Different implementations and variants will be explained as well. The following disclosure has been facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples for illustration purposes and should not limit the scope of the disclosure. A skilled reader will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet.

Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

Figure 5:
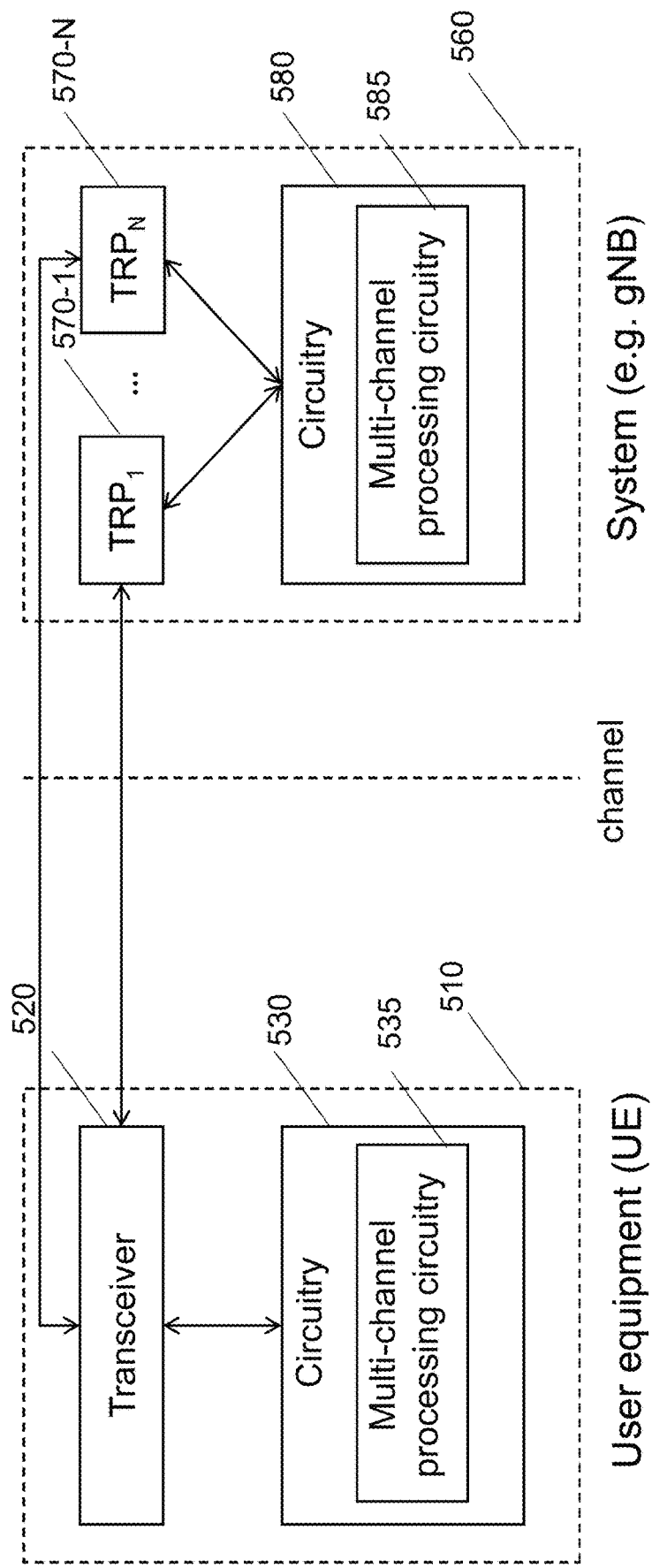
FIG. 5 illustrates a block diagram of an exemplary structure of a user equipment and a network node.

FIG. 5 illustrates a block diagram of a wireless communication system including a user equipment 510 (also referred to as UE), and a system 560 such as a base station (also referred to as g Node B, gNB). The user equipment 510 comprises (processing) circuitry 530 and a transceiver 520 which are indicated as separate building blocks in the diagram. In particular, the circuitry 530 includes a multi-channel processing circuitry 535.

Similarly, system 560, such as a base station, comprises (processing) circuitry 580 and a total number of N transmission and reception points (also referred to as TRPs) 570-1 to 570-N, where N can be two, three or more, which are indicated as separate building blocks in the diagram. In short, the system 560 comprises a plurality of TRPs. In particular, the circuitry 580 includes a multi-channel processing circuitry 585.

Figure 7:
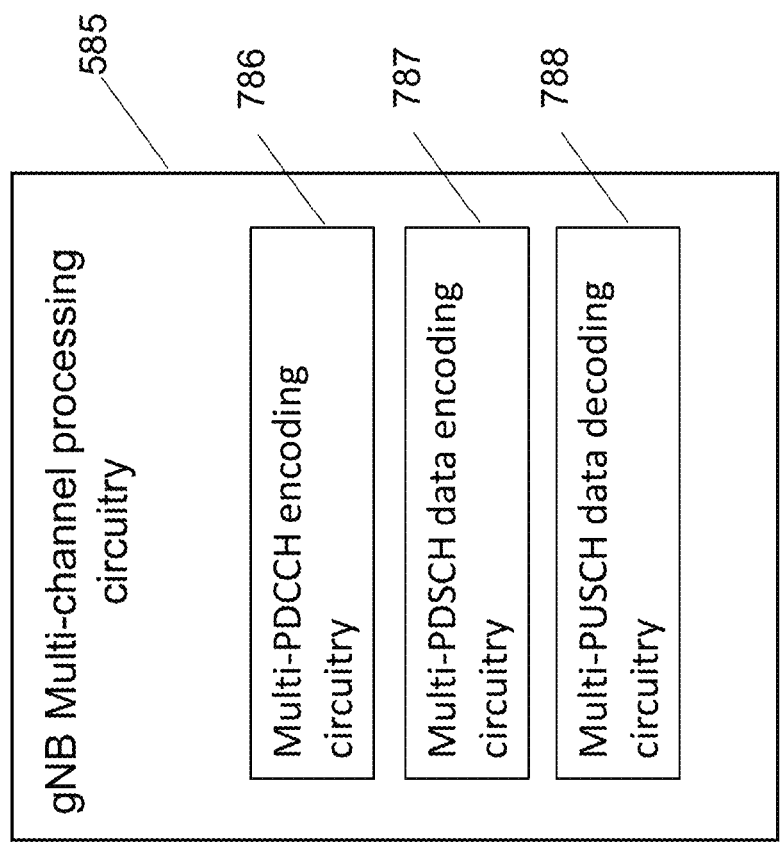
FIGS. 6-7 show block diagrams of an exemplary structure of a circuitry of a user equipment and of a circuitry of a gNB.
Figure 6:
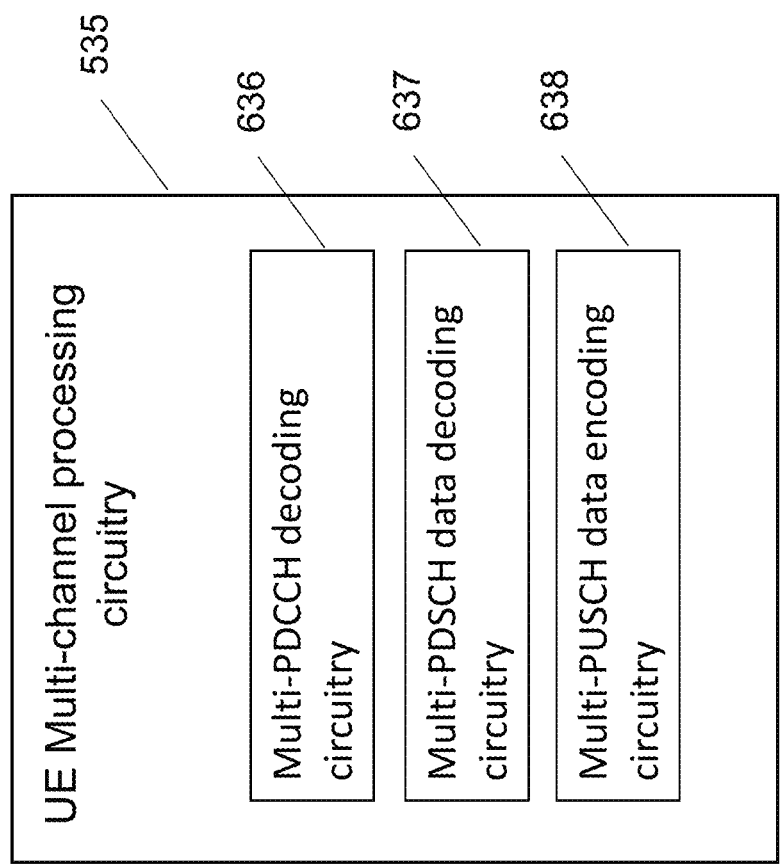

FIGS. 6 and 7 are exploded views of exemplary implementations of the building blocks termed "multi-channel processing circuitry" 535 and 585 of FIG. 5 of the UE 510 and of the system 560, respectively. For ease of reference, the circuitry 535 is henceforth referred to as UE multi-channel processing circuitry 535 and the circuitry 585 is henceforth referred to as gNB multi-channel processing circuitry 585.

The UE multi-channel processing circuitry 535 in the exemplary implementation illustrated in FIG. 6 includes a multi-PDCCH decoding circuitry 636, a multi-PDSCH data decoding circuitry 637 and a multi-PUSCH data encoding circuitry 638. The gNB multi-channel processing circuitry 585 in the exemplary implementation illustrated in FIG. 7 includes a multi-PDCCH encoding circuitry 786, a multi-PDSCH data encoding circuitry 787 and a multi-PUSCH data decoding circuitry 788.

The UE multi-channel processing circuitry 535 as well as the gNB multi-channel processing circuitry 585 thus comprise circuits which permit a parallel processing of physical channels including PDCCH, PDSCH and PUSCH.

In general, the following description assumes that the UE 510 is in communication reach to a system 560 with plural TRPs 570-1 . . . 570-N. And in this context a use case of multi-TRP coordination is discussed. This use case facilitates providing robust and prompt signaling in communication using multiple transmission and reception points.

The transceiver 520 of the UE receives plural physical downlink control channels, PDCCHs from each of the plural TRPs 570-1 . . . 570-N, in a transmission time interval, TTI. In other words, the UE receives more than one PDCCHs from one of the plural TRPs 570-1 and more than one PDCCHs from all other of the plurality of TRPs 570-N.

According to one example, the TTI may correspond to a slot within a radio frame, in case the generic scenario is deployed to a slot based scheduling mechanism. Alternatively, the TTI may correspond to a given number of symbols, e.g., 7, 4 or 2 OFDM symbols, in case a non-slot based (mini-slot based) scheduling mechanism is used. In any case, the UE receives the plural PDCCHs within the same TTI from each of the plural TRPs.

Then, the circuitry 530 of the UE, for instance, the multi-channel processing circuitry 535 or, more particularly, the multi-PDCCH decoding circuitry 636, decodes plural downlink control information, DCIs. The decoded DCI are respectively carried on the received plural PDCCHs from each of the plural TRPs 570-1 . . . 570-N. In other words, each of the plural PDCCHs from each of the plural TRPs 570-1 . . . 570-N carries a DCI to be decoded by the circuitry 530.

The plural decoded DCIs from each of the TRPs 570-1 . . . 570-N are provided for respectively scheduling plural physical downlink shared channel (PDSCH) receptions on the plural TRPs 570-1 . . . 570-N, or are provided for respectively scheduling plural physical uplink shared channels (PUSCH) transmissions on the plural TRPs 570-1 . . . 570-N.

For conciseness reasons, the present disclosure mentions both alternative physical channels which can be scheduled in the generic scenario using an 'or' combination. This simply results from the understanding that for the present disclosure it is not decisive whether the DCIs carried on the PDCCHs are scheduling PDSCH or PUSCH. Rather, it is only important that a data transmission between the TRPs 570-1 . . . 570-N and the UE is being scheduled irrespective of whether it is carried in the uplink or downlink.

Thus, the present disclosure could have equally referred to the more general expression where the decoded DCIs carried on the PDCCHs are scheduling (any) shared channel transmissions for the TRPs 570-1 . . . 570-N. In any case, the present disclosure is referring to cases where the decoded plural DCIs are exclusively scheduling PDSCHs or are exclusively scheduling PUSCHs.

The scheduling is prescribed through two separate criteria which have to be jointly met according to the present disclosure.

A first criterion prescribes how the plural DCIs from each (individual) one of the TRPs are scheduling PDSCH receptions or PUSCH transmission. This first criterion prescribes that all of the plural decoded DCIs, which are carried on the plural PDCCHs received from each one of the plural TRPs, e.g., TRP 570-1 or TRP 570-N, are scheduling plural PDSCH receptions or plural PUSCH transmission on different ones of the plural TRPs 570-1 . . . 570-N.

Considering the exemplary case where from one TRP, e.g., TRP 570-1, plural PDCCHs are received, and these plural PDCCHs from the one TRP respectively carry plural DCIs. Then, all of these plural DCIs respectively schedule plural PDSCH receptions on different ones of the plural TRPs 570-1 . . . 570-N, or all of these plural DCIs respectively schedule plural PUSCH transmissions on different ones of the plural TRPs 570-1 . . . 570-N.

Accordingly, the plural DCIs from one TRP do not only schedule PDSCH receptions or PUSCH transmission on the same one TRP but on different ones of the plural TRPs. Hence, this first criterion facilitates improving spatial diversity.

The present disclosure is however not limited to the exemplary case where plural PDCCHs are only received from one TRP, e.g., TRP 570-1. Rather, the present disclosure states the above for each one of the plural TRPs. In other words, all of the plural DCIs which are from each one of the plural TRPs 570-1 . . . 570-N, are respectively scheduling plural PDSCH reception or are respectively scheduling PUSCH transmission on different ones of the plural TRPs 570-1 . . . 570-N.

A second criterion prescribes how plural DCIs from different ones of the TRPS are scheduling PDSCH receptions or PUSCH transmission. This second criterion prescribes that all of the plural PDSCH receptions or PUSCH transmissions are scheduled such that (e.g., exactly) one of the decoded plural DCIs from each one of the plural TRPs, is scheduling a same one of PDSCH reception or a same one PUSCH transmission on a same one of the plural TRPs.

Considering the exemplary case where one same PDSCH reception or a same PUSCH transmission is scheduled on a same one TRP, e.g., TRP 570-1. Then the second criterion prescribes that (e.g., exactly) one of the decoded plural DCIs from each one of the plural TRPs 570-1 . . . 570-N, is scheduling the same PDSCH reception or the same PUSCH transmission on the same TRP, e.g., TRP 570-1.

Accordingly, there is one DCI from each of the TRPs which is scheduling the same PDSCH reception or PUSCH transmission on the same TRP. Hence, this facilitates improving the redundancy during scheduling.

The present disclosure is however not limited to the exemplary case where only one same PDSCH reception or PUSCH transmission is scheduled on one same TRP, e.g., TRP 570-1. Rather, the present disclosure states the above for all of the plural PSCH receptions or plural PUSCH transmissions. In other words, all of the plural PDSCH receptions or PUSCH transmissions are scheduled such that (e.g., exactly) one of the decoded plural DCIs from each one of the plural TRPs, is scheduling a same one of PDSCH reception or a same one PUSCH transmission on a same one of the plural TRPs.

Then, the transceiver 520 of the UE receives or transmits same data in the respectively scheduled plural PDSCH receptions from or plural PUSCH transmissions to each of the plural TRPs, 570-1 . . . 570-N. In other words, the plural PDSCH receptions are thus received by the transceiver 520 of the UE from the plural TRPs with the same data. Alternatively, the plural PUSCH transmissions are thus transmitted by the transceiver 520 of the UE to the plural TRPs with the same data.

The plural PDSCH receptions may subsequently be processed by the multi-channel processing circuitry 535 or, more particularly, the multi-PDSCH data decoding circuitry 637 of the UE. Alternatively, the plural PUSCH transmission may beforehand be processed by the multi-channel processing circuitry 535 or, ore particularly, the multi-PUSCH data encoding circuitry 638 of the UE.

Accordingly, the UE receives or transmits same data for each one of the plural TRPs. Hence, this facilitates improving the data redundancy.

Assuming, for example, that the connection between one of the TRPs 570-1 . . . 570-N to the UE was blocked during scheduling. Then, the first criterion provides that some PDCCHs scheduling this blocked one of the TRPs can at all be received, namely from a different one of the TRPs. The second criterion prescribes that the 'some' PDCCHs scheduling this blocked TRP are actually redundant versions of the scheduling information which would have been received from the blocked TRP.

And if the connection between one of the TRPs 570-1 . . . 570-N is still blocked during data reception/transmission, then the reception or transmission of same (redundant) data ensures that the PDSCH or PDSCH on the blocked TRP do not result in any data losses. Accordingly, the generic scenario facilitates satisfying the requirements of URLLC by utilizing multi-TRP communication, but are not limited to URLLC use cases.

Again, assuming that only the first criterion was applied and the second criterion was not applied, then this would ensure that a UE could at all receive PDCCHs scheduling a blocked TRP. However, it would nowhere be said that this received PDCCHs scheduling the blocked TRP would schedule a same PDSCH reception or PUSCH transmission as that one which was possibly not received due to the blockage of the TRP. Hence, the first criterion synergistically combines with the second criterion.

The above description has been given from the perspective of the UE. This shall, however, not be understood as a limitation to the present disclosure. Evidently, the system 560, such as a base station, comprising a plurality of TRPs 570-1 . . . 570-N equally performs the generic scenario disclosed herein.

This entails that the plural TRPs 570-1 . . . 570-N transmit plural PDCCHs, physical downlink control channels, from each one of the plural TRPs to an UE, user equipment, within a single TTI, transmission time interval. The plural DCIs, downlink control information, are respectively carried on the plural PDCCHs transmitted from each one of the plural TRPs to the UE 510. The plural DCIs may beforehand be processed in the multi-channel processing circuitry 585, in particular, in the multi-PDCCH encoding circuitry 786.

According to the first criterion, all of the decoded plural DCIs from each one of the plural TRPs are respectively scheduling plural PDSCH, physical downlink shared channel, transmissions or plural PUSCH, physical uplink shared channel, receptions on different ones of the plural TRPs. And according to the second criterion, all of the plural PDSCH receptions or plural PUSCH transmission are scheduled such that one of the decoded plural DCIs from each one of the plural TRPs, is scheduling a same one PDSCH transmission or a same one PUSCH receptions on a same one of the plural TRPs.

Then, the plurality of TRPs 570-1 . . . 570-N are transmitting or receiving same data in the respectively scheduled plural PDSCH transmissions or plural PUSCH receptions on each one of the plural TRPs to or from the UE 510. The plural PDSCH transmissions may beforehand be processed by the multi-channel processing circuitry 585 or, more particularly, the multi-PDSCH data encoding circuitry 787. Alternatively, the plural PUSCH transmission may subsequently be processed by the multi-channel processing circuitry 585 or, ore particularly, the multi-PUSCH data decoding circuitry 788.

Implementations

According to an exemplary implementation, the transceiver 530 of the UE receives or transmits the same data in the respectively scheduled plural PDSCH receptions from or plural PUSCH transmission to each one of the plural TRPs 570-1 . . . 570-N using same or different communication parameters. In other words the transceiver 530 performs this communication from or to each of the plural TRPs 570-1 . . . 570-N completely separate, thereby facilitating an adaptation of the communication parameters to the respective radio channel.

For example, the communication parameters, include at least one of: MCS, Modulation and Coding Scheme, RV, redundancy version, frequency domain resource assignment, time domain resource assignment, HARQ process number, antenna ports, TCI, transmission configuration indicator, DMRS sequence initialization, transmit power control, TPC, command for PUSCH, frequency hopping flag for PUSCH, precoding information and number of layers for PUSCH.

Should, for example, a radio channel between one of the plural TRPs, e.g., TRP 570-1, and the UE 510 facilitate using a higher MCS, then this can be achieved by each of the plural TRPs transmitting plural PDCCHs carrying DCIs indicating same higher MCS for the according data transmission for the one of the plural TRPs, e.g., TRP 570-1.

At the same, should, for example another radio channel between another one of the TRPs, e.g., TRP 570-N and the UE 510 facilitate using frequency hopping for PUSCH, then this can be achieved by each of the plural TRPs transmitting plural PDCCHs carrying DCIs indicating same frequency hopping flag for the corresponding data transmission to the other one of the plural TRPs, e.g., TRP 570-N.

In any case, facilitating an adaptation of the communication parameters to the respective radio channel improves the data communication between the plural TRPs 570-1 . . . 570-N and the UE.

This adaptation does not prevent the UE from receiving or transmitting the same data from or to the plural TRPs 570-1 . . . 570-N. Rather, the term data shall be understood as corresponding to payload information (only), not to the adjustments which have been applied thereto due to variations between the radio channels. In other words, the communication of same data increases the redundancy to avoid blockages, and does prevent from individual adjustments which are mandated by any radio channel.

According to another exemplary implementation, the transceiver 520 of the UE receives or transmits the same data in the respectively scheduled plural PDSCH receptions from or plural PUSCH transmission to each one of the plural TRPs 570-1 . . . 570-N using plural antenna ports (e.g., multiple layers).

This may include one PDSCH reception from one TRP, e.g., TRP 570-1 with data in one codeword on two layers, e.g., layer 1 and layer 2, and another one PDCCH reception from another TRP, e.g., TRP 570-N with same data (also) in one codeword on two layers, e.g., layer 1 and layer 2.

Alternatively, in case the transceiver 520 of the UE uses different numbers of antenna ports (e.g., different number of layers) for receiving or transmitting the same data for different ones of the plural TRPs, the circuitry 530, in operation, respectively determines different MCSs to be used by the transceiver as the different communication parameters for receiving or transmitting the same data.

First Embodiment

Figure 8:
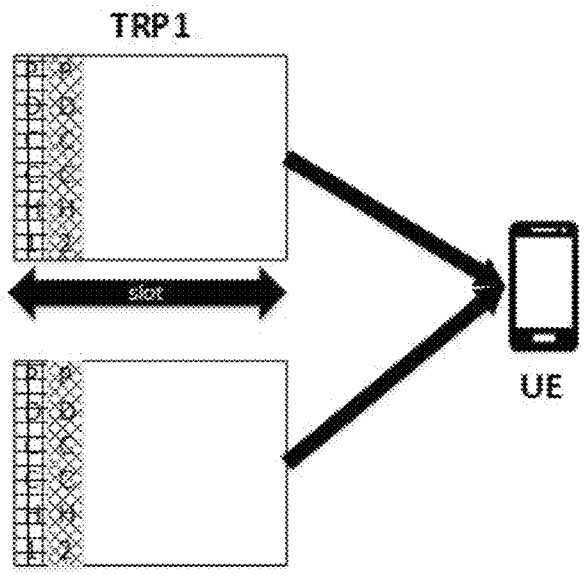
FIG. 8 depicts a graph schematically illustrating reception of PDCCHs according to an exemplary embodiment.
Figure 9:
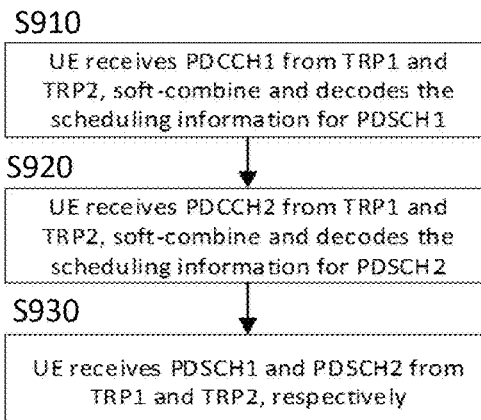
FIG. 9 illustrates a flow chart of an exemplary embodiment of a UE communication method.
Figure 10:
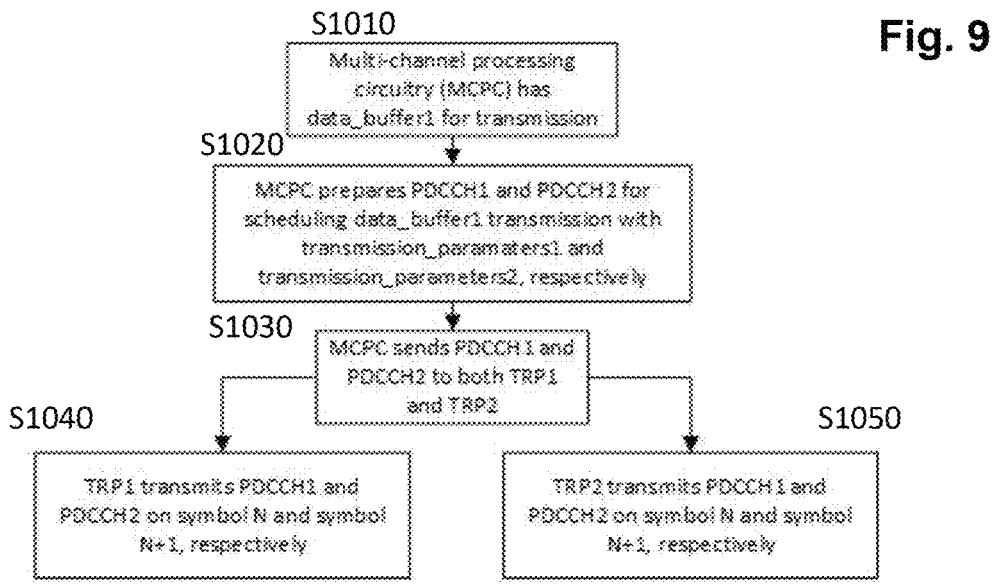
FIG. 10 shows a flow chart of an exemplary embodiment of a gNB communication method.

Referring now to an exemplary first embodiment which will be described with reference to the flow chart detailing an UE communication method as shown in FIG. 9 or to the flow chart detailing a gNB communication method as shown in FIG. 10. Both flow charts refer to the graph schematically illustrating reception of PDCCHs as shown in FIG. 8.

This first embodiment is conceived with the understanding that the gNB has two TRPs, namely TRP1 and TRP2 and from each one of these two TRPs the UE receives two PDCCHs within a transmission time interval, TTI that can be either a slot or shorter than a slot which are respectively carrying two DCIs, namely a first DCI and a second DCI, each scheduling one of total two PDSCH transmissions from the gNB to the UE on the respective two TRPs, TRP 1 and TRP 2. Again, this shall not limit the present disclosure.

To achieve this, the gNB has a multi-channel processing circuitry, such as for instance a (central) baseband unit.

Within the multi-channel processing circuitry of the gNB, there is a data buffer (see S1010—FIG. 10) with data for transmission to the UE.

Then, the multi-channel processing circuitry of the gNB prepares (S1020—FIG. 10) for transmitting two PDCCH, namely PDCCH 1 and PDCCH 2 to the UE. Each of the prepared PDCCHs is carrying a DCI for scheduling separate transmissions with the same data from data buffer over the different two TRPs. For example, the PDCCH 1 is carrying the first DCI and the PDCCH 2 is carrying the second DCI.

For the transmissions on two PDSCHs from the two TRPs, the respective two DCIs include respective two communication parameters which facilitate an adjustment to the different radio channels between TRP 1 and the UE and TRP 2 and the UE. In this respect, the first DCI to be carried on PDCCH1 from TRP 1 and TRP 2 includes the communication parameter for the scheduling of PDSCH 1 on TRP 1 and the second DCI to be carried on PDCCH 2 from TRP 1 and TRP 2 includes the communication parameter for scheduling PDSCH 2 on TRP 2.

As this embodiment is focusing on PDSCH transmissions only, the two communication parameters are also referred to as transmission parameters 1 and 2, thereby emphasizing that PDSCH is a downlink channel transmission between the TRPs 1 and 2 and the UE.

Thereafter, the multi-channel processing circuitry of the gNB sends (S1030—FIG. 10) the two PDCCHs, namely PDCCH 1 and PDCCH 2 to both TRP1 and TRP 2. In other words, PDCCH 1 and PDCCH 2 is sent to TRP 1, and PDCCH 1 and PDCCH 2 is sent to TRP 2.

In case the gNB is provided with one RF unit, the multi-channel processing circuitry sends the two PDCCHs via this one RF unit to both TRP 1 and TRP 2. Alternatively, in case the gNB is provided with two RF units, then the multi-channel processing circuitry sends PDCCH 1 and PDCCH 2 via one RF unit to TRP 1 and sends PDCCH 1 and PDCCH 2 via the other RF unit to TRP 2.

The two PDCCHs are processed in parallel by TRP 1 and TRP 2, thereby permitting the transmission of the two PDCCHs from both TRPs in one (single) TTI. Depending on whether the link between TRPs and 2 and the respective one or two RF units is ideal or non-ideal the processing by TRP 1 and TRP 2 includes a time adjustment to compensate for the delay.

The TRP 1 transmits (S1040—FIG. 10) to the UE PDCCH 1 on symbol N of the one TTI and transmits PDCCH 2 on a later symbol N+1 of the one TTI. Both symbols N and N+1 are configured for TRP 1 to belong to the same control resource set, CORESET, namely CORESET 1 in case of 2-symbol length CORESET or both symbols N and N+1 are configured for TRP 1 to belong to different control resource set, CORESET, namely CORESET 1 and CORESET 2 in case of 1-symbol length CORESET.

At the same time, the TRP 2 transmits (S1050—FIG. 10) to the UE PDCCH 1 on symbol N of the same one TTI, and transmits PDCCH 2 on a later symbol N+1 of the one TTI. Both symbols N and N+1 are configured for TRP 2 to belong to the same CORESET, namely CORESET 3, which is however different from CORESET 1 Of TRP1 in case of 2-symbol length CORESET or both symbols N and N+1 are configured for TRP 2 to belong to different control resource set, CORESET, namely CORESET 3 and CORESET 4, which is however different from CORESET 1 and CORESTE2 of TRP1 in case of 1-symbol length CORESET.

Transmitting PDCCH 1 and PDCCH 2 also entails that each TRP1 and TRP 2 is transmitting DM-RS, demodulation reference signals. Only with these DM-RS, the UE can demodulate PDCCH 1 and PDCCH 2 and detect the respective DCIs carried thereon.

The transmission of PDCCH 1 and PDCCH 2 from both TRP 1 and 2 on different symbols within a TTI to the UE is shown in FIG. 8.

Then, the UE receives (S910—FIG. 9) PDCCH 1 from both TRP 1 and TRP 2. Again, the PDCCH 1 is received from TRP 1 in the symbol N and the PDCCH 1 is received from TRP 2 in the same symbol N.

More particularly, the PDCCH 1 is received from TRP 1 in the symbol N belonging to CORESET 1 in case of 2-symbol length CORESET and in case of 1-symbol length CORESET. The PDCCH 1 is received from TRP 2 in the same symbol N belonging to CORESET 2 in case of 2-symbol length CORESET or belonging to CORESET 3 in case of 1-symbol length CORESET. In other words, PDCCH 1 is received from both TRP 1 and 2 in a same time-frequency resource, namely in the same symbol N.

Putting it differently, the UE receives, in a same time-frequency resource which is included (or belongs) to different CORESETs plural PDCCHs (i.e., twice PDCCH 1) which are received from the different TRPs 1 and 2, and which carry two DCIs that are scheduling a same one PDSCH reception on a same TRP, namely TRP 1.

As part of the reception operation, the UE uses the same demodulation reference signals for demodulation of PDCCH 1 transmitted from TRP 1 and for demodulation of PDCCH 1 transmitted from TRP 2.

The UE performs as part of the reception operation soft-combining of the PDCCH 1 from TRP 1 and PDCCH 1 form TRP 2. Same demodulation reference signals transmission from both TRPs allow for one combined channel estimation. After demodulation, the UE then decodes the DCI carried on PDCCH 1 with the scheduling information for PDSCH 1. The soft-combining facilitates improving the chances to correctly decode the DCI carried on PDCCH 1.

Also, the UE receives (S920—FIG. 9) PDCCH 2 from both TRP 1 and TRP 2. Again, the PDCCH 2 is received from TRP 1 in the symbol N+1 belonging to CORESET 1 in case of 2-symbol length CORESET or belonging to CORESET 2 in case of 1-symbol length CORESET. The PDCCH 2 is received from TRP 2 in the same symbol N+1 belonging to CORESET 3 in case of 2-symbol length CORESET or belonging to CORESET 4 in case of 1-symbol length CORESET. In other words, PDCCH 2 is also received from both TRP 1 and 2 in a same time-frequency resource, namely in the same symbol N+1.

As part of the reception operation, the UE uses the same or different demodulation reference signals for demodulation of PDCCH 2 transmitted from TRP 1 and for demodulation of PDCCH 2 transmitted from TRP 2.

The UE performs as part of the reception operation soft-combining of the PDCCH 2 from TRP 1 and PDCCH 2 form TRP 2. Same demodulation reference signals transmission from both TRPs allow for one combined channel estimation. After demodulation, the UE then decodes the DCI carried on PDCCH 2 with the scheduling information for PDSCH 2. The soft-combining facilitates improving the chances to correctly decode the DCI carried on PDCCH 2.

In consistence with the generic scenario discussed above, it can be appreciated that also this embodiment meets the first constraint, namely all of the decoded DCIs from each of the TRPS, TRP 1 and TRP 2, are respectively scheduling PDSCH 1 and PDSCH 2 on different ones of the TRPs TRP 1 and TRP 2.

This means, a first DCI of PDCCH 1 from TRP 1, and a second DCI of PDCCH 2 from TRP 1, both are respectively scheduling two PDCSHs, namely PDSCH 1 and PDSCH 2 on different TRPs TRP 1 and TRP 2. Equally, the DCIs from TRP 2 schedule two PDSCHs on different TRPs.

Additionally, this embodiment meets the second constraint in that for all the two PDSCHs PDSCH 1 and PDSCH 2, there is one DCI, e.g., the first DCI of PDCCH 1 from TRP 1 and the first DCI of PDCCH 1 from TRP 2, for each one of the TRPs TRP 1 and TRP2, which is scheduling a same PDSCH, e.g., PDSCH 1 on a same TRP, e.g., TRP 1.

This means that each of the two PDSCHs PDSCH 1 and PDSCH 2 is (redundantly) scheduled. In case of PDSCH 1, a same PDSCH 1 is scheduled with one DCI on PDCCH from each of the TRPs TRP 1 and TRP 2 (i.e., one DCI from TRP 1 and another DCI from TRP 2), and also in case of PDSCH 2, a same PDSCH 2 is scheduled with one DCI on PDCCH from each of the TRPs TRP1 and TRP 2 (i.e., one DCI from TRP 1 and another DCI from TRP 2).

With these two constraints a robust and prompt scheduling of PDSCH can be facilitated. Particularly so, since the PDCCH 1 and PDCCH 2 are transmitted on both TRP 1 and TRP 2.

Finally, the UE receives (S930—FIG. 9) PDSCH 1 from TRP 1 and PDSCH 2 from TRP 2. Both PDSCHs PDSCH 1 and PDSCH 2 convey same data such that in case one PDSCH is not received by the UE, the robust and prompt decoding of the data can be facilitated.

Second Embodiment

Figure 11:
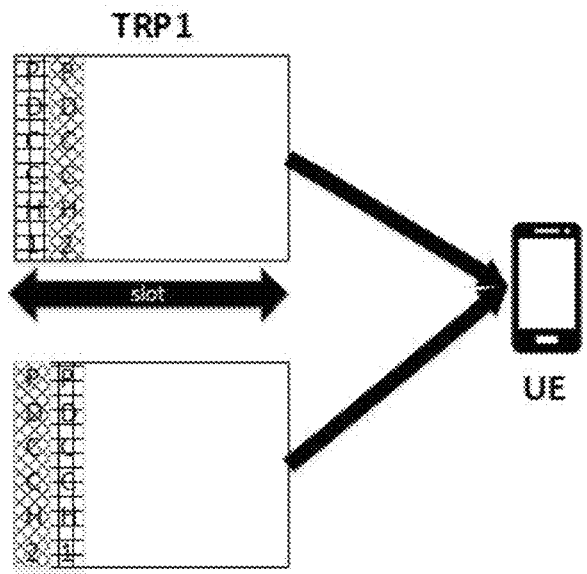
FIG. 11 depicts a graph schematically illustrating reception of PDCCHs according to an exemplary embodiment.
Figure 12:
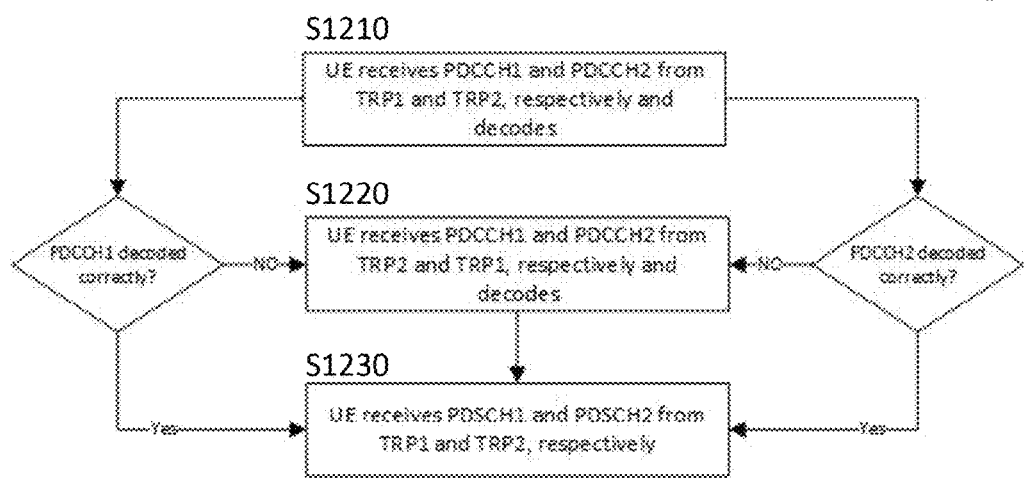
FIG. 12 illustrates a flow chart of an exemplary embodiment of a UE communication method.
Figure 13:
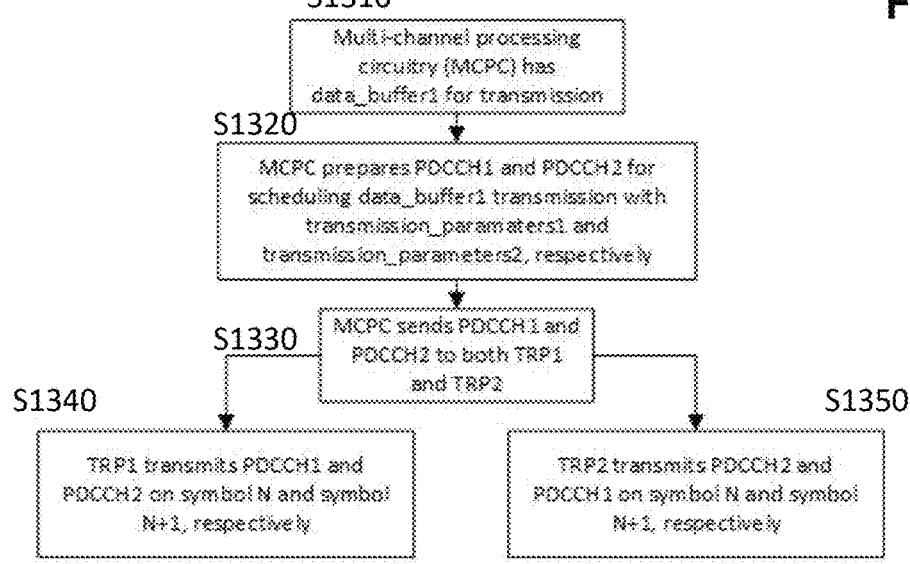
FIG. 13 shows a flow chart of an exemplary embodiment of a gNB communication method.

Referring now to an exemplary second embodiment which will be described with reference to the flow chart detailing an UE communication method as shown in FIG. 12 or to the flow chart detailing a gNB communication method as shown in FIG. 13. Both flow charts refer to the graph schematically illustrating reception of PDCCHs as shown in FIG. 11.

This second embodiment is conceived with the understanding that the gNB has (again) two TRPs, namely TRP1 and TRP2 and from each one of these two TRPs the UE receives two PDCCHs within a slot which are respectively carrying two DCIs, namely a first and second DCI, each scheduling one of total two PDSCH transmissions from the gNB to the UE on the respective two TRPs, TRP 1 and TRP 2. Again, this shall not limit the present disclosure.

Different from the first embodiment, the gNB no longer transmits two PDCCHs from each of the two TRP on same time-frequency resources, but instead transmits the two PDCCHs from each of the two TRPs on different time-frequency resources. This facilitates reducing the processing load upon the UE during normal (non-blocked) operation and will be discussed in further detail in the following.

The gNB has a multi-channel processing circuitry, such as for instance a (central) baseband unit. Within the multi-channel processing circuitry of the gNB, there is a data buffer (see S1310—FIG. 13) with data for transmission to the UE.

Then, the multi-channel processing circuitry of the gNB prepares (S1320—FIG. 13) for transmitting two PDCCH, namely PDCCH 1 and PDCCH 2 to the UE. Each of the prepared PDCCHs is carrying a DCI for scheduling separate transmissions with the same data from data buffer over the different two TRPs. For example, the PDCCH 1 is carrying the first DCI and the PDCCH 2 is carrying the second DCI.

For the transmissions on two PDSCHs from the two TRPs, the respective two DCIs include respective two communication parameters which facilitate an adjustment to the different radio channels between TRP 1 and the UE and TRP 2 and the UE. In this respect, the first DCI to be carried on PDCCH1 from TRP 1 and TRP 2 includes the communication parameter for the scheduling of PDSCH 1 on TRP 1 and the second DCI to be carried on PDCCH 2 from TRP 1 and TRP 2 includes the communication parameter for scheduling PDSCH 2 on TRP 2.

As this embodiment is again focusing on PDSCH transmissions only, the two communication parameters are also referred to as transmission parameters 1 and 2, thereby emphasizing that PDSCH is a downlink channel transmission between the TRPs 1 and 2 and the UE.

Thereafter, the multi-channel processing circuitry of the gNB sends (S1330—FIG. 13) the two PDCCHs, namely PDCCH 1 and PDCCH 2 to both TRP1 and TRP 2. In other words, PDCCH 1 and PDCCH 2 is sent to TRP 1, and PDCCH 1 and PDCCH 2 is sent to TRP 2.

In case the gNB is provided with one RF unit, the multi-channel processing circuitry sends the two PDCCHs via this one RF unit to both TRP 1 and TRP 2. Alternatively, in case the gNB is provided with two RF units, then the multi-channel processing circuitry sends PDCCH 1 and PDCCH 2 via one RF unit to TRP 1 and sends PDCCH 1 and PDCCH 2 via the other RF unit to TRP 2.

The two PDCCHs are processed in parallel by TRP 1 and TRP 2, thereby permitting the transmission of the two PDCCHs from both TRPs in one (single) TTI. Depending on whether the link between TRPs and 2 and the respective one or two RF units is ideal or non-ideal the processing by TRP 1 and TRP 2 includes a time adjustment to compensate for the delay.

The TRP 1 transmits (S1340—FIG. 13) to the UE PDCCH 1 on symbol N of the one TTI and transmits PDCCH 2 on a later symbol N+1 of the one TTI. Both symbols N and N+1 are configured for TRP 1 to belong to different control resource sets, CORESET, namely CORESET 1 and CORESET 2, e.g., which are 1-symbol length CORESETs.

At the same time, the TRP 2 transmits (S1350—FIG. 13) to the UE PDCCH 2 on symbol N of the same one TTI, and transmits PDCCH 1 on a later symbol N+1 of the one TTI. Both symbols N and N+1 are configured for TRP 2 to also belong to different control resource sets, CORESETs, namely CORESET 3 and CORESET 4, which are however different from CORESET 1 and CORESTE2 of TRP1, and, e.g., which are 1-symbol length CORESETs.

Therewith, in the second exemplary embodiment, the TRP 1 transmits the PDCCH 1 on a different time-frequency resource (symbol N) when compared with the PDCCH 1 transmission from TRP 2 (symbol N+1). Also the TRP 2 transmits PDCCH 2 on a different time-frequency resource (symbol N+1) when compared with the PDCCH 2 transmission from TRP 2 (symbol N). This can also be phrased differently:

Both TRPs, TRP 1 and TRP 2 respectively transmit on a same time-frequency resource (symbol N) different PDCCHs, namely PDCCH 1 and PDCCH 2 which are carrying DCIs scheduling different PDSCH transmission on different TRPs. In other words, TRP 1 transmits on a same time-frequency resource (symbol N) PDCCH 1 with a first DCI scheduling the PDSCH 1 transmission on TRP 1, whereas TRP 2 transmits on the same time-frequency resource (symbol N) PDCCH 2 with a second DCI scheduling the PDSCH 2 transmission on TRP 2.

Transmitting PDCCH 1 and PDCCH 2 also entails that each TRP1 and TRP 2 is transmitting DM-RS, demodulation reference signals. Only with these DM-RS, the UE can demodulate PDCCH 1 and PDCCH 2 and detect the respective DCIs carried thereon.

The transmission of PDCCH 1 and PDCCH 2 from both TRP 1 and 2 on different symbols within a TTI to the UE is shown in FIG. 11.

Then, the UE receives (S1210—FIG. 12) PDCCH 1 from TRP 1 and PDCCH 2 from TRP 2. Again, the PDCCH 1 is received from TRP 1 in the symbol N and the PDCCH 2 is received from TRP 2 in the same symbol N.

More particularly, the PDCCH 1 is received from TRP 1 in the symbol N belonging to CORESET 1 in case of 2-symbol length CORESET and in case of 1-symbol length CORESET. The PDCCH 2 is received from TRP 2 in the same symbol N belonging to CORESET 2 in case of 2-symbol length CORESET or belonging to CORESET 3 in case of 1-symbol length CORESET.

In other words, PDCCH 1 and PDCCH 2 are respectively received from both TRP 1 and 2 in a same time-frequency resource, namely in the same symbol N.

Putting it differently, the UE receives, in a same time-frequency resource which is included (or belongs) to different CORESETs plural PDCCHs (i.e., PDCCH 1 and PDCCH 2) which are received from the different TRPs 1 and 2, and which carry two DCIs that are scheduling different PDSCH reception on different TRPs, namely TRP 1 and TRP 2.

As part of the reception operation, the UE uses different demodulation reference signals for demodulation of PDCCH 1 transmitted from TRP 1 and for demodulation of PDCCH 2 transmitted from TRP 2.

Depending on whether the UE has correctly decoded the PDCCH 1 from TRP 1 and the PDCCH 2 from TRP 2, the following step is performed.

When the UE does not decode one of the two PDCCHs correctly, only then the UE decodes (S1220—FIG. 12) PDCCH 2 from both TRP 1 and PDCCH 1 from TRP 2. Again, the PDCCH 2 is received from TRP 1 in the symbol N+1 and PDCCH 1 is received from TRP 2 in the same symbol N+1. In other words, when the UE decodes both PDCCHs correctly, then the UE can skip any further decoding of PDCCHs from TRP 1 and TRP 2 in the symbol N+1.

Due to the fact that different PDCCHs, namely PDCCH 1 and PDCCH 2, from the two TRPs TRP 1 and TRP 2 are transmitted in the same time frequency resource (symbol N), the UE knows that after having successfully received same different PDCCHs at a same time-frequency resource, e.g., the earlier resource corresponding to symbol N not symbol N+1, it can skip any PDCCH reception at any further time-frequency resource, e.g., the later resource corresponding to symbol N+1.

This facilitates reducing the processing load when receiving PDCCHs at the UE. In particular, during normal operation, with correct PDCCH receptions, the UE in this embodiment does not suffer from any additional processing load (step S1220 is skipped) as compared with the normal multi-TRP coordination use case, while during abnormal (partially blocked) operation, this embodiment (still) facilitates a robust and prompt scheduling of PDSCH.

In more detail, the PDCCH 2 is received from TRP 1 in the symbol N+1 belonging to CORESET 1 in case of 2-symbol length CORESET or belonging to CORESET 2 in case of 1-symbol length CORESET. The PDCCH 1 is received from TRP 2 in the same symbol N+1 belonging to CORESET 2 in case of 2-symbol length CORESET or belonging to CORESET 4 in case of 1-symbol length CORESET. In other words, PDCCH 2 and PDCCH 1 are respectively received from both TRP 1 and 2 in a same time-frequency resource, namely in the same symbol N+1.

As part of the reception operation, the UE uses different demodulation reference signals for demodulation of PDCCH 2 transmitted from TRP 1 and for demodulation of PDCCH 2 transmitted from TRP 2. After demodulation, the UE then decodes the DCIs carried on PDCCH 2 with the scheduling information for PDSCH 2.

In consistence with the generic scenario discussed above, it can be appreciated that also this embodiment meets the first constraint, namely all of the decoded DCIs from each of the TRPS, TRP 1 and TRP 2, are respectively scheduling PDSCH 1 and PDSCH 2 on different ones of the TRPs TRP 1 and TRP 2.

This means, a first DCI of PDCCH 1 from TRP 1, and a second DCI of PDCCH 2 from TRP 1, both are respectively scheduling two PDCSCHs, namely PDSCH 1 and PDSCH 2 on different TRPs TRP 1 and TRP 2. Equally, the DCIs from TRP 2 schedule two PDSCHs on different TRPs.

Additionally, this embodiment meets the second constraint in that for all the two PDSCHs PDSCH 1 and PDSCH 2, there is one DCI, e.g., the first DCI of PDCCH 1 from TRP 1 and the first DCI of PDCCH 1 from TRP 2, for each one of the TRPs TRP 1 and TRP2, which is scheduling a same PDSCH, e.g., PDSCH 1 on a same TRP, e.g., TRP 1.

This means that each of the two PDSCHs PDSCH 1 and PDSCH 2 is (redundantly) scheduled. In case of PDSCH 1, a same PDSCH 1 is scheduled with one DCI on PDCCH from each of the TRPs TRP 1 and TRP 2 (i.e., one DCI from TRP 1 and another DCI from TRP 2), and also in case of PDSCH 2, a same PDSCH 2 is scheduled with one DCI on PDCCH from each of the TRPs TRP1 and TRP 2 (i.e., one DCI from TRP 1 and another DCI from TRP 2).

With these two constraints a robust and prompt scheduling of PDSCH can be facilitated. Particularly so, since the PDCCH 1 and PDCCH 2 are transmitted on both TRP 1 and TRP 2.

Finally, the UE receives (S1230—FIG. 12) PDSCH 1 from TRP 1 and PDSCH 2 from TRP 2. Both PDSCHs PDSCH 1 and PDSCH 2 convey same data such that in case one PDSCH is not received by the UE, the robust and prompt decoding of the data can be facilitated.

According to a first aspect, a user equipment is provided, comprising: a circuitry and transceiver. The transceiver receives plural PDCCHs, physical downlink control channels, from each one of plural TRPs, transmission and reception points, within a single TTI, transmission time interval. The circuitry decodes plural DCIs, downlink control information, respectively carried on the received plural PDCCHs from each one of the plural TRPs. All of the decoded plural DCIs from each one of the plural TRPs are respectively scheduling plural PDSCH, physical downlink shared channel, receptions or plural PUSCH, physical uplink shared channel, transmissions on different ones of the plural TRPs, and all of the plural PDSCH receptions or plural PUSCH transmission are scheduled such that one of the decoded plural DCIs from each one of the plural TRPs, is scheduling a same one PDSCH reception or a same one PUSCH transmission on a same one of the plural TRPs. And, the transceiver receives or transmits same data in the respectively scheduled plural PDSCH receptions from or plural PUSCH transmission to each one of the plural TRPs.

According to a second aspect provided in addition to the first aspect, the transceiver, in operation, receives each one of the plural PDCCHs from one of the plural TRPs in a same or different CORESET, control resource set.

According to a third aspect provided in addition to the first or second aspect, the transceiver, in operation, receives the plural PDCCHs from each one of the plural TRPs in different CORESETs.

According to a fourth aspect provided in addition to the first to third aspect, the transceiver receives in a same time-frequency resource, which is included in different CORESETs, plural PDCCHs, which are: PDCCHs that are respectively received from different ones of the plural TRPs, and PDCCHs carrying plural DCIs that are scheduling a same one PDSCH reception or a same one PUSCH transmission on a same one of the plural TRPs.

According to a fifth aspect provided in addition to the second to fourth aspect, the circuitry, prior to decoding each one of the plural DCIs, performs channel estimation using same DM-RS, demodulation reference signals, associated with plural PDCCHs from each of the plural TRPs.

According to a sixth aspect provided in addition to the second to fifth aspect, the circuitry, and prior to decoding the plural DCIs, performs soft-combining of PDCCHs from different ones of the plural TRPs which are received in the same time-frequency resource.

According to a seventh aspect provided in addition to the first aspect, the transceiver receives each one of the plural PDCCHs from one of the plural TRPs in same or different CORESETs.

According to an eight aspect provided in addition to a first or seventh aspect, the transceiver receives the plural PDCCHs from each one of plural TRPs, in different CORESETs.

According to a ninth aspect provided in addition to the first, seventh and eight aspect the transceiver receives in a same time-frequency resources, which is included in different CORESETs, plural PDCCHs, which are: PDCCHs that are respectively received from different ones of the plural TRPs, and PDCCHs carrying plural DCIs that are respectively scheduling plural PDSCH receptions or plural PUSCH transmission on different ones the plural TRPs.

According to a tenth aspect provided in addition to the seventh to ninth aspect, the circuitry, prior to decoding each one of the plural DCIs, performs channel estimation using different DM-RS respectively associated with plural PDCCHs from each of the plural TRPs.

According to an eleventh aspect provided in addition to the ninth aspect, the same time-frequency resource corresponds to a first symbol in the single TTI in which the transceiver, in operation, receives the plural PDCCHs from each of the plural TRPs.

According to the twelfth aspect provided in addition to the first to eleventh aspect, the transceiver, in operation, receives or transmits the same data for each of the plural TRPs using same or different communication parameters.

According to the thirteenth aspect provided in addition to the twelfth aspect, the communication parameters, include at least one of: MCS, Modulation and Coding Scheme, RV, redundancy version, frequency domain resource assignment, time domain resource assignment, HARQ process number, antenna ports, TCI, transmission configuration indicator, DMRS sequence initialization, transmit power control, TPC, command for PUSCH, frequency hopping flag for PUSCH, precoding information and number of layers for PUSCH.

According to the fourteenth aspect provided in addition to the twelfth or thirteenth aspect, the transceiver receives or transmits the same data for at least one of the plural TRPs using plural antenna ports.

According to a fifteenth aspect provided in addition to the fourteenth aspect, in case the transceiver uses different numbers of antenna ports for receiving or transmitting the same data on different ones of the plural TRPs, the circuitry, in operation, respectively determines different MCSs to be used by the transceiver as the different communication parameters for receiving or transmitting the same data.

According to the sixteenth aspect provided in addition to the first to fifteenth aspect, the plurality of TRPs correspond to two, three or more TRPs.

According to a seventeenth aspect, a system is provided, comprising a plurality of TRPs, transmission and reception points.

The plural TRPs transmit plural PDCCHs, physical downlink control channels, from each one of the plural TRPs to an UE, user equipment, within a single TTI, transmission time interval, wherein plural DCIs, downlink control information, are respectively carried on the plural PDCCHs transmitted from each one of the plural TRPs to the UE.

All of the decoded plural DCIs from each one of the plural TRPs are respectively scheduling plural PDSCH, physical downlink shared channel, transmissions or plural PUSCH, physical uplink shared channel, receptions on different ones of the plural TRPs. And, all of the plural PDSCH receptions or plural PUSCH transmission are scheduled such that one of the decoded plural DCIs from each one of the plural TRPs, is scheduling a same one PDSCH transmission or a same one PUSCH receptions on a same one of the plural TRPs.

The plurality of TRPs, in operation, are transmitting or receiving same data in the respectively scheduled plural PDSCH transmissions or plural PUSCH receptions on each one of the plural TRPs to or from the UE.

According to an eighteenth aspect, a method for a user equipment is provided. The user equipment receives plural PDCCHs, physical downlink control channels, from each one of plural TRPs, transmission and reception points, within a single TTI, transmission time interval. The user equipment decodes plural DCIs, downlink control information, respectively carried on the received plural PDCCHs from each one of the plural TRPs. All of the decoded plural DCIs from each one of the plural TRPs are respectively scheduling plural PDSCH, physical downlink shared channel, receptions or plural PUSCH, physical uplink shared channel, transmissions on different ones of the plural TRPs. And all of the plural PDSCH receptions or plural PUSCH transmission are scheduled such that one of the decoded plural DCIs from each one of the plural TRPs, is scheduling a same one PDSCH reception or a same one PUSCH transmission on a same one of the plural TRPs. The user equipment receives or transmits same data in the respectively scheduled plural PDSCH receptions from or PUSCH transmission to each one of the plural TRPs.

According to a nineteenth aspect, a method for a base station is disclosed. The base station transmits plural PDCCHs, physical downlink control channels, from each one of the plural TRPs, transmission and reception points, to an UE, user equipment, within a single TTI, transmission time interval, wherein plural DCIs, downlink control information, are respectively carried on the plural PDCCHs transmitted from each one of the plural TRPs to the UE. All of the decoded plural DCIs from each one of the plural TRPs is respectively scheduling plural PDSCH, physical downlink shared channel, transmissions or plural PUSCH, physical uplink shared channel, receptions on different ones of the plural TRPs. And all of the plural PDSCH receptions or plural PUSCH transmission are scheduled such that one of the decoded plural DCIs from each one of the plural TRPs, is scheduling a same one PDSCH transmission or a same one PUSCH receptions on a same one of the plural TRPs. The base station transmits or receives same data in the respectively scheduled plural PDSCH transmissions or plural PUSCH receptions on each one of the plural TRPs to or from the UE.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs.

The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used.

The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus.

Some non-limiting examples of such communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things" (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
   a transceiver which, in operation, receives plural PDCCHs (physical downlink control channels) including a first PDCCH and a second PDCCH, from each one of plural TRPs (transmission and reception points) including a first TRP and a second TRP, within a single TTI (transmission time interval),
   wherein the first PDCCH and the second PDCCH are received from the first TRP, and the first PDCCH and the second PDCCH are received from the second TRP;
   circuitry which, in operation, decodes plural DCIs (downlink control information) including a first DCI carried on the first PDCCH and a second DCI carried on the second PDCCH,
   wherein the first DCI and the second DCI received in a second symbol are not decoded in case the first DCI and the second DCI received in a first symbol are decoded,
   wherein the decoded plural DCIs from each one of the plural TRPs schedule plural PDSCH (physical downlink shared channel) receptions including a first PDSCH reception and a second PDSCH reception or plural PUSCH (physical uplink shared channel) transmissions including a first PUSCH transmission and a second PUSCH transmission, and
   wherein the first DCI schedules the first PDSCH reception or the first PUSCH transmission on the first TRP and the second DCI schedules the second PDSCH reception or the second PUSCH transmission on the second TRP; and the transceiver, in operation, receives same data from the first TRP and from the second TRP in the scheduled plural PDSCH receptions or transmits same data to the first TRP and to the second TRP in the scheduled plural PUSCH transmissions.

2. The user equipment according to claim 1, wherein the transceiver, in operation, receives each one of the plural PDCCHs from one of the plural TRPs in a same or different CORESET (control resource set), and/or the transceiver, in operation, receives the plural PDCCHs from each one of the plural TRPs in different CORESETs and/or the transceiver, in operation, receives in a same time-frequency resource, which is included in different CORESETs, plural PDCCHs, which are:

PDCCHs that are respectively received from different ones of the plural TRPs; and PDCCHs carrying plural DCIs that are scheduling a same one PDSCH reception or a same one PUSCH transmission on a same one of the plural TRPs.

3. The user equipment according to claim 2, wherein the circuitry, in operation and prior to decoding the plural DCIs, performs channel estimation using same DM-RS (demodulation reference signals) associated with the plural PDCCHs from each of the plural TRPs.

4. The user equipment according to claim 2, wherein the circuitry, in operation and prior to decoding the plural DCIs, performs soft-combining of PDCCHs from different ones of the plural TRPs which are received in the same time-frequency resource.

5. The user equipment according to claim 1, wherein the transceiver, in operation, receives each one of the plural PDCCHs from one of the plural TRPs in same or different CORESETs (control resource sets), and/or the transceiver, in operation, receives the plural PDCCHs from each one of the plural TRPs, in different CORESETs, and/or the transceiver, in operation, receives in a same time-frequency resources, which is included in different CORESETs, plural PDCCHs, which are:

PDCCHs that are respectively received from different ones of the plural TRPs; and PDCCHs carrying plural DCIs that are respectively scheduling plural PDSCH receptions or plural PUSCH transmissions on different ones of the plural TRPs.

6. The user equipment according to claim 5, wherein the circuitry, in operation and prior to decoding the plural DCIs, performs channel estimation using different DM-RS (demodulation reference signals) respectively associated with the plural PDCCHs from each of the plural TRPs.

7. The user equipment according to claim 5, wherein the same time-frequency resource corresponds to a first symbol in the single TTI in which the transceiver, in operation, receives the plural PDCCHs from each of the plural TRPs.

8. The user equipment according to claim 1, wherein the transceiver, in operation, receives or transmits the same data for each of the plural TRPs using same or different communication parameters.

9. The user equipment according to claim 8, wherein the communication parameters, include at least one of: MCS (Modulation and Coding Scheme), RV (redundancy version), frequency domain resource assignment, time domain resource assignment, HARQ (hybrid automatic repeat request) process number, antenna ports, TCI (transmission configuration indicator), DMRS (demodulation reference signal) sequence initialization, transmit power control (TPC) command for PUSCH, frequency hopping flag for PUSCH, precoding information and number of layers for PUSCH.

10. The user equipment according to claim 8, wherein the transceiver, in operation, receives or transmits the same data for at least one of the plural TRPs using plural antenna ports.

11. The user equipment according to claim 10, wherein in case the transceiver uses different numbers of antenna ports for receiving or transmitting the same data on different ones of the plural TRPs, the circuitry, in operation, respectively determines different MCSs (Modulation and Coding Schemes) to be used by the transceiver as the different communication parameters for receiving or transmitting the same data.

12. The user equipment according to claim 1, wherein the plurality of TRPs correspond to two, three or more TRPs.

13. A system, comprising:

a plurality of TRPs (transmission and reception points) including a first TRP and a second TRP, which, in operation, transmit plural PDCCHs (physical downlink control channels) including a first PDCCH and a second PDCCH, from each one of the plural TRPs, to an UE (user equipment), within a single TTI (transmission time interval), wherein the first TRP transmits the first PDCCH and the second PDCCH, and the second TRP transmits the first PDCCH and the second PDCCH, wherein plural DCIs (downlink control information) include a first DCI carried on the first PDCCH and a second DCI carried on the second PDCCH, wherein the first DCI and the second DCI received in a second symbol are not decoded in case the first DCI and the second DCI received in a first symbol are decoded, wherein the decoded plural DCIs from each one of the plural TRPs schedule plural PDSCH (physical downlink shared channel) transmissions including a first PDSCH transmission and a second PDSCH transmission or plural PUSCH (physical uplink shared channel) receptions including a first PUSCH reception and a second PUSCH reception, and wherein the first DCI schedules the first PDSCH transmission or the first PUSCH reception on the first TRP and the second DCI schedules the second PDSCH transmission or the second PUSCH reception on the second TRP; and the first TRP and the second TRP, in operation, are transmitting same data to the UE in the scheduled plural PDSCH transmissions or receiving same data from the UE in the scheduled plural PUSCH receptions.

14. A method for a user equipment, comprising the steps of:

receiving plural PDCCHs (physical downlink control channels) including a first PDCCH and a second PDCCH, from each one of plural TRPs (transmission and reception points) including a first TRP and a second TRP, within a single TTI (transmission time interval), wherein the first PDCCH and the second PDCCH are received from the first TRP, and the first PDCCH and the second PDCCH are received from the second TRP;

decoding plural DCIs (downlink control information) including a first DCI carried on the first PDCCH and a second DCI carried on the second PDCCH, wherein the first DCI and the second DCI received in a second symbol are not decoded in case the first DCI and the second DCI received in a first symbol are decoded, wherein the decoded plural DCIs from each one of the plural TRPs schedule plural PDSCH (physical downlink shared channel) receptions including a first PDSCH reception and a second PDSCH reception or plural PUSCH (physical uplink shared channel) transmissions including a first PUSCH transmission and a second PUSCH transmission, and wherein the first DCI schedules the first PDSCH reception or the first PUSCH transmission on the first TRP and the second DCI schedules the second PDSCH reception or the second PUSCH transmission on the second TRP; and receiving same data from the first TRP and from the second TRP in the scheduled plural PDSCH receptions or transmitting same data to the first TRP and to the second TRP in the plural PUSCH transmissions.

15. A method for a system, comprising the steps of:

transmitting plural PDCCHs (physical downlink control channels) including a first PDCCH and a second PDCCH, from each one of plural TRPs (transmission and reception points) including a first TRP and a second TRP, to an UE (user equipment), within a single TTI (transmission time interval), wherein the first TRP transmits the first PDCCH and the second PDCCH, and the second TRP transmits the first PDCCH and the second PDCCH, wherein plural DCIs (downlink control information) include a first DCI carried on the first PDCCH and a second DCI carried on the second PDCCH, wherein the first DCI and the second DCI received in a second symbol are not decoded in case the first DCI and the second DCI received in a first symbol are decoded, wherein the decoded plural DCIs from each one of the plural TRPs schedule plural PDSCH (physical downlink shared channel) transmissions including a first PDSCH transmission and a second PDSCH transmission or plural PUSCH (physical uplink shared channel) receptions including a first PUSCH reception and a second PUSCH reception, and wherein the first DCI schedules the first PDSCH transmission or the first PUSCH reception on the first TRP and the second DCI schedules the second PDSCH transmission or the second PUSCH reception on the second TRP; and transmitting, from the first TRP and from the second TRP, same data to the UE in the scheduled plural PDSCH transmissions or receiving, at the first TRP and at the second TRP, same data from the UE in the scheduled plural PUSCH receptions.

* * * * *

UNITED STATES PATENT AND TRADEMARK OFFICE
CERTIFICATE OF CORRECTION

PATENT NO. : 11,711,116 B2
APPLICATION NO. : 17/085149
DATED : July 25, 2023
INVENTOR(S) : Ankit Bhamri et al.

Page 1 of 1

It is certified that error appears in the above-identified patent and that said Letters Patent is hereby corrected as shown below:

On the Title Page

Item (71) Applicant:
"(71) Applicant: Panasonic Intellectual Property Corporation of America, Torrence, CA (US)"
Should read:
--(71) Applicant: Panasonic Intellectual Property Corporation of America, Torrance, CA (US)--.

Signed and Sealed this
First Day of October, 2024

Katherine Kelly Vidal
*Director of the United States Patent and Trademark Office*